United States Patent [19]

Heine et al.

[11] Patent Number: 5,448,318
[45] Date of Patent: Sep. 5, 1995

[54] CLAMP ASSEMBLY SET FOR ATTACHING A VARIETY OF OPTICAL DEVICES TO EYEGLASSES

[75] Inventors: Helmut Heine, Herrsching; Gerhard Gügel, Diessen; Otto H. Schmidt, Herrsching, all of Germany

[73] Assignee: Heine Optotechnik GmbH & Co. KG, Herrsching, Germany

[21] Appl. No.: 194,710

[22] Filed: Feb. 10, 1994

[30] Foreign Application Priority Data

Feb. 17, 1993 [DE] Germany ............. 9302304 U

[51] Int. Cl.⁶ .............. G02C 9/04; G02C 11/00; A61B 3/10
[52] U.S. Cl. .............. 351/245; 351/48; 351/57; 351/158
[58] Field of Search ........ 351/47, 48, 57, 130, 351/133, 140, 152, 155, 158, 200, 205, 245; 359/350, 355, 356, 811, 815, 818; 2/13, 443; 362/804

[56] References Cited

U.S. PATENT DOCUMENTS

| | | | |
|---|---|---|---|
| 2,759,395 | 8/1956 | Wofford | 359/818 X |
| 2,842,029 | 7/1958 | Roth | 351/57 |
| 3,183,523 | 5/1965 | Harrison | 2/13 |
| 3,988,058 | 10/1976 | Chaney et al. | 351/50 |
| 4,196,981 | 4/1980 | Waldrop | 351/57 X |
| 4,711,539 | 12/1987 | Krusas et al. | 351/63 |
| 4,810,081 | 3/1989 | Mapelli et al. | 351/158 X |
| 5,164,749 | 11/1992 | Shelton | 351/57 X |
| 5,339,464 | 8/1994 | Dor | 359/815 X |

FOREIGN PATENT DOCUMENTS 1097716 1/1961 Germany .

*Primary Examiner*—William L. Sikes
*Assistant Examiner*—David R. Parsons
*Attorney, Agent, or Firm*—Griffin, Butler, Whisenhunt & Kurtossy

[57] ABSTRACT

A clamp assembly comprises a clamp (12) having two levers (1, 2) linked at middle areas thereof with first ends thereof closing together to form clamping jaws (5, 6) and second, opposite, ends thereof formed as opening grips (3, 4) for separating the clamping jaws, which are spring loaded toward one another. The clamping jaws (5, 6) have forked shapes. The branches of the forks, and the ends thereof, are arranged to be spaced from one another so that they extend across, or extend over, a bridge of a pair of eyeglasses to be placed on inner, upper edges of spectacle glasses (13) or on an eyeglass frame (14). A first lever (2) of the clamp (12) has thereon a clamp coupling element (10, 19, 22, 24) for being selectively attached to, and selectively detached from, an optical-device coupling element (18, 20, 23, 25) on an optical device. The clamp assembly makes possible an easy and quick exchange of optical devices to be attached thereto.

7 Claims, 10 Drawing Sheets

CLAMP ASSEMBLY SET FOR ATTACHING A VARIETY OF OPTICAL DEVICES TO EYEGLASSES

BACKGROUND OF THE INVENTION

This invention relates generally to the art of clamps, and more specifically to a clamp assembly for attaching optical and illumination accessories, designated below as optical devices, on eyeglasses, as desired.

Attachments of the type mentioned above, for example, binocular magnifiers, ophthalmoscopes, lamps for coaxial and direct illumination, as well as combinations of these attachments, are either fixedly mounted on eyeglass frames or can be mounted thereon by means of plug-in apparatus fixedly attached to the eyeglass frames.

Because of mechanical demands for sturdiness, and affixing possibilities for attachment or plug-in apparatus, only particular, sturdy eyeglass frames are suitable for this purpose. The limited choice—often only one model is offered by manufacturers of optical or illumination attachments - requires a compromise with wearing comfort because it is often necessary to wear them for a long time. However, a comfortable seating of eyeglasses is very important. Also, cosmetic considerations can limit the use of such devices on eyeglasses.

Eyeglass carriers must, additionally, be useable on particular eyeglass frames for particular correction lenses, whereby production costs could be increased tremendously.

German Patent DE-PS 1 097 716 discloses an eyeglass shade with light-beam-dimming (shading) panes (or light-transmissive shields). This shade has a clamp assembly with two levers linked at middle areas thereof with first ends thereof closing together to form clamping jaws and second, opposite, ends thereof formed as opening grips for separating the clamping jaws, which are spring loaded toward one another. The clamping jaws are in the form of forks with branches of the forks being formed so that ends of the branches of each fork are spaced from one another to extend across a bridge of a pair of eyeglasses to be mounted, or placed on, the eyeglasses at inner, upper edges of lenses thereof or on an eyeglass frame. Because the clamp assembly and shading panes are unreleasably attached to one another the shading panes cannot be replaced by other attachments.

A similar construction is disclosed in U.S. Pat. No. 3,183,523.

It is an object of this invention to provide a clamp assembly for being mounted on any desired eyeglass frames and for releasably engaging optical devices of various types to the eyeglass frames for allowing various types of examination apparatus to be mounted on eyeglass frames.

SUMMARY

According to principles of a clamp apparatus of this invention, one element of a releasable, shape or force interengagable, attachment device is respectively mounted on one lever of an eyeglass clamp and the other is respectively mounted on an optical device to be attached to the glasses.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

Each of FIGS. 5-11 is a perspective, exploded, view of an alternate embodiment of a clamp assembly of this invention and an optical device, each clamp assembly including releasable coupling elements of an attaching device.

DESCRIPTION OF THE PREFERRED EMBODIMENT

Figure 1:
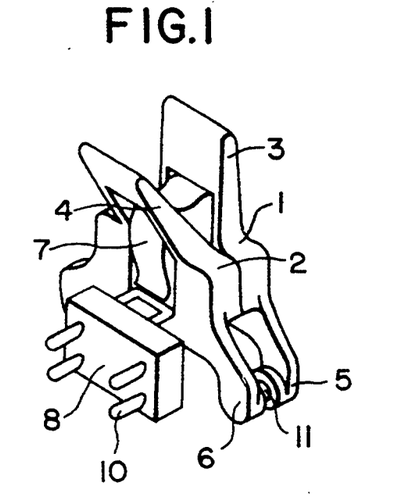
FIG. 1 is a perspective view of a portion of a clamp assembly of this invention for attaching optical devices.
Figure 2:
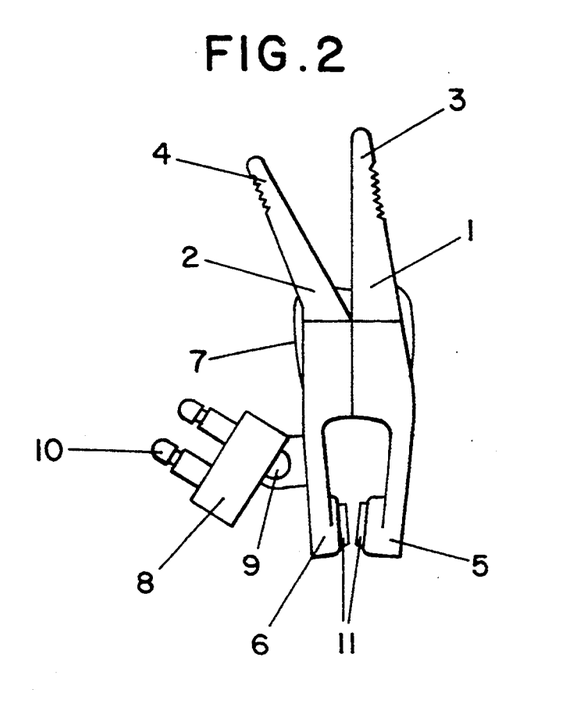
FIG. 2 is a side view of the portion of the clamp assembly of FIG. 1.

FIGS. 1 and 2 respectively show perspective and side views of a clamp 12 of a clamp assembly having two levers 1 and 2 whose gripping ends 3 and 4 angle away from one another and whose clamping jaws 5 and 6 are spring loaded toward one another by means of a spring 7. In this regard, only the gripping end of the distal lever 2 is divergently offset at an angle. The gripping end 3 of the proximal lever 1 is straight in order to avoid contact with a forehead of a wearer. Clamping jaws 5 and 6 can be opened in the same manner as a clothesline pin by pressing together the gripping ends 3 and 4.

The clamping jaws 5 and 6 of the levers 1 and 2 are formed in the shape of forks such that ends of branches of the forks function as clamping jaws with interposed pads 11 positioned opposite one another, to be placed on inner, upper, edges of spectacle glasses, or lenses 13 (FIGS. 3 and 4), or on a frame 14 of eyeglasses 15.

A plate 8 is coupled to the lever 2 of the clamp assembly 12 by means of a pivot joint 9 on which, as an example of a releasable shape-interengaging coupling element, plugs 10 are attached.

Figure 3:
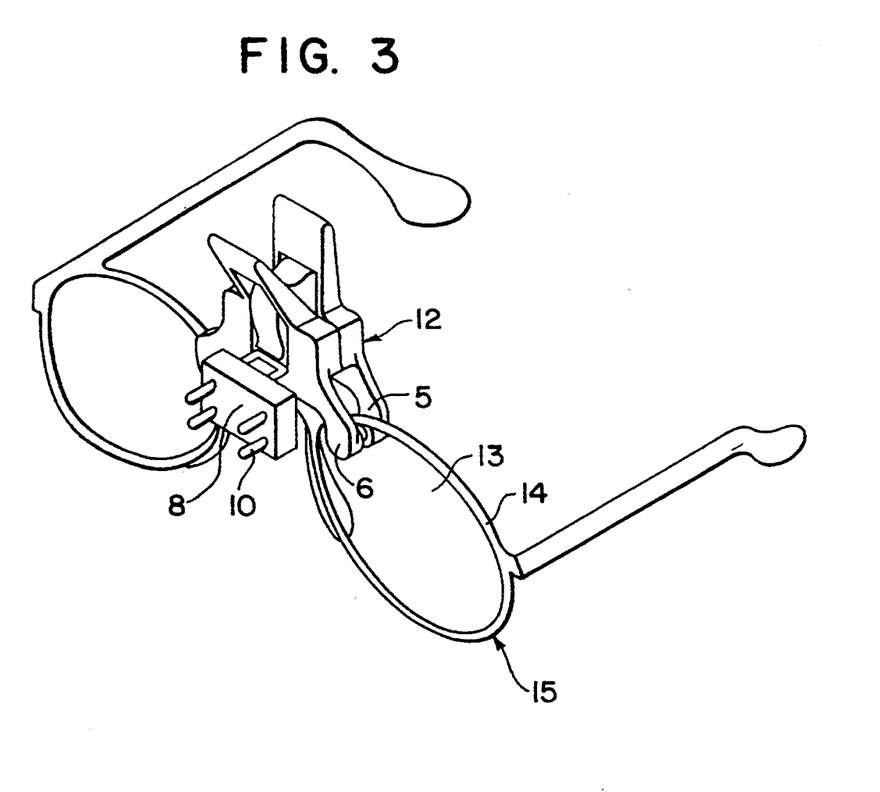
FIG. 3 is a perspective view of eyeglasses with the portion of the clamp assembly of this invention shown in FIGS. 1 and 2 mounted thereon.

FIG. 3 shows a perspective view of such a portion of a clamp assembly 12 attached to a frame 14 of eyeglasses 15.

Figure 4:
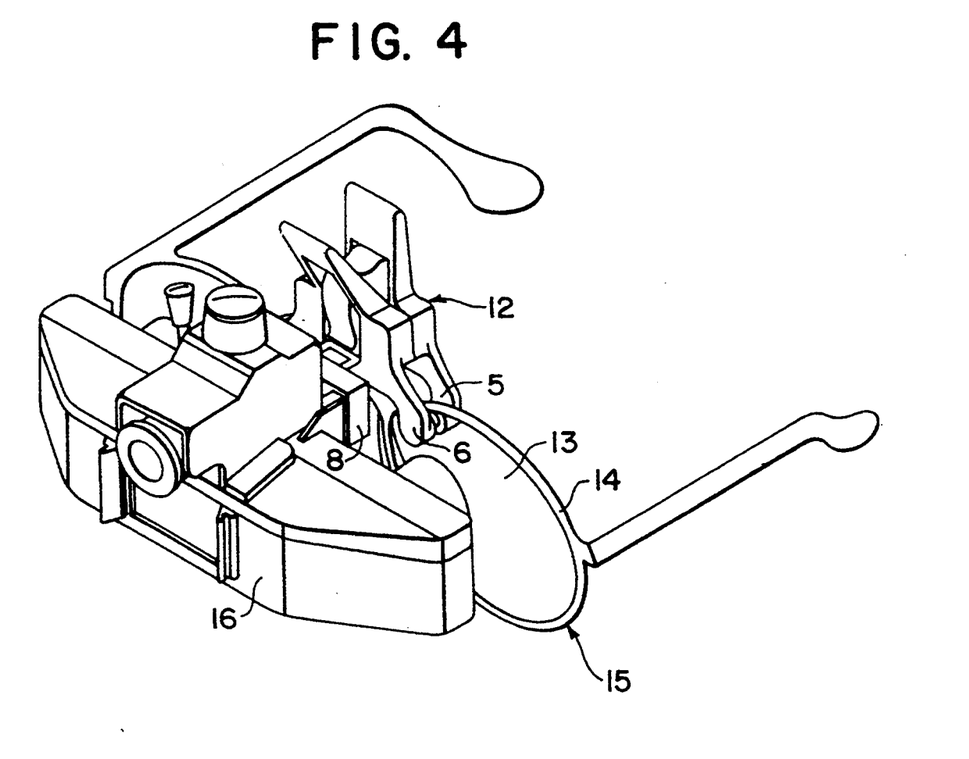
FIG. 4 is a perspective view of eyeglasses with a clamp assembly of this invention and an optical device in the form of an indirect binocular ophthalmoscope attached thereto.

FIG. 4 shows, as an example, an indirect binocular ophthalmoscope 16 mounted on a frame 14 of eyeglasses 15 by means of the clamp assembly including the clamp 12.

FIGS. 5 through 11 disclose releasable shape-interconnected and force-interconnected coupling elements of attachment devices according to this invention.

Figure 5:
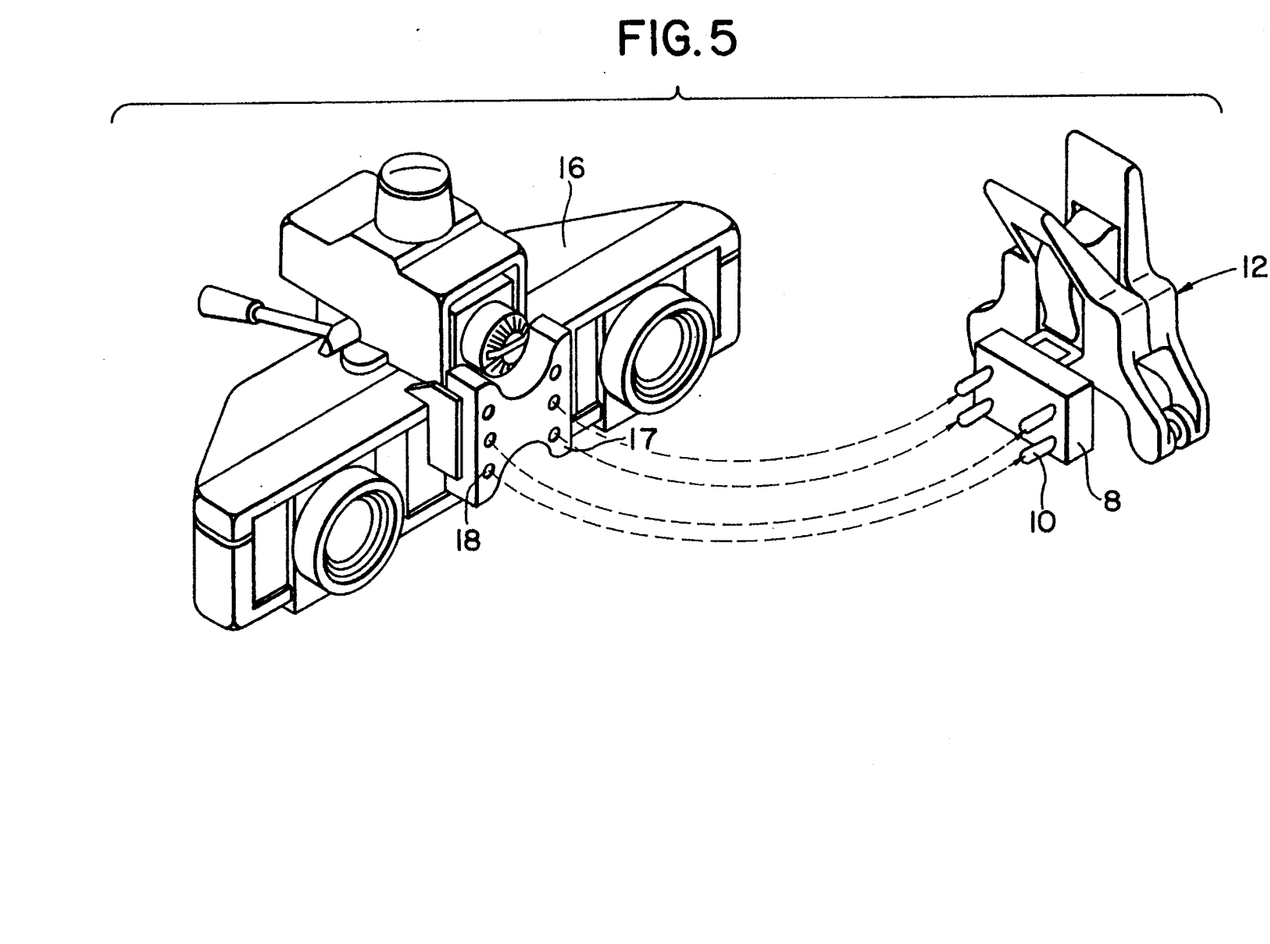

In this regard, FIG. 5 shows the clamp assembly described above with reference to FIGS. 1-4. As can clearly be seen in FIG. 5 a second coupling element comprising an opposite plate 17 is attached to the ophthalmoscope 16 in which there are two rows of three sockets, one above the other in each row, to receive the pins, or plugs, 10. This releasable attachment device allows one to adjust the heights of the plugs 10 along to the sockets 18.

Figure 6:
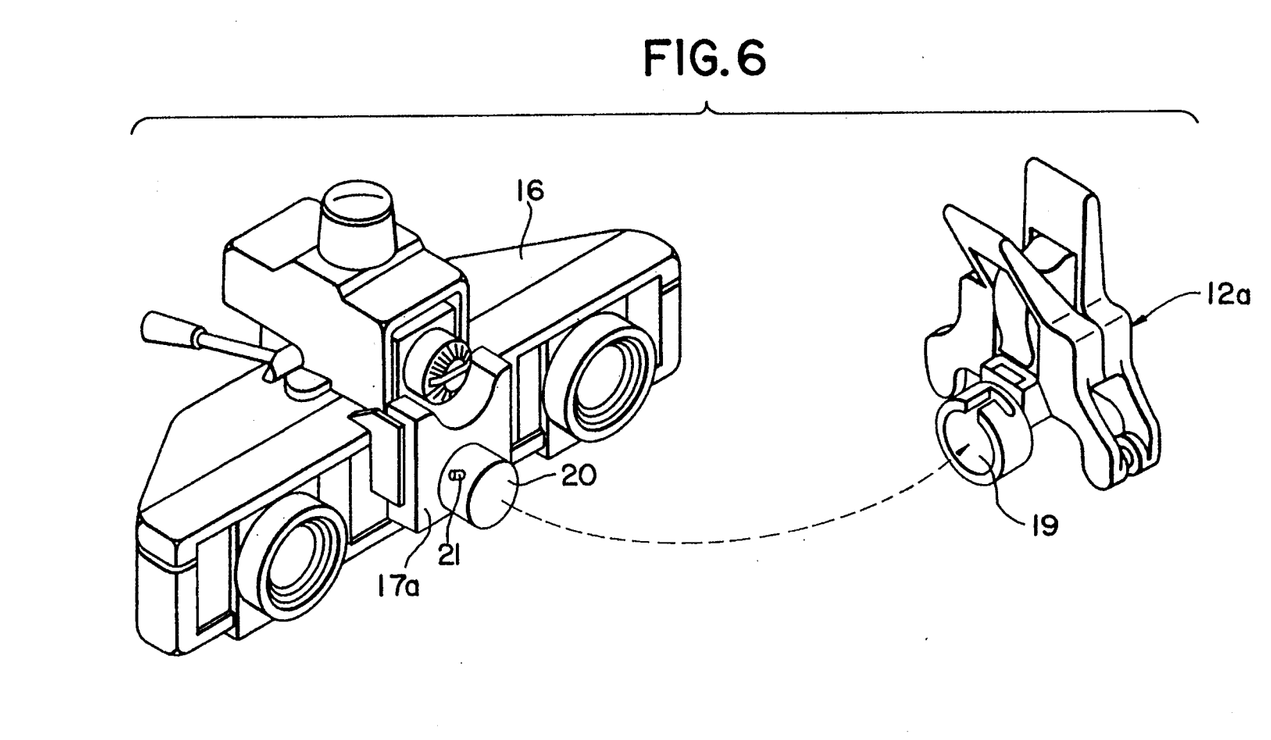

According to the embodiment of FIG. 6, a clamp 12a of a clamp assembly includes a bayonet receiver 19. Accordingly, as can be seen in FIG. 6, an opposite plate 17a on the ophthalmoscope 16 has a bayonet plug 20 with an angular latching pin 21 thereon for mating with a groove in the bayonet receiver 19.

Figure 7:
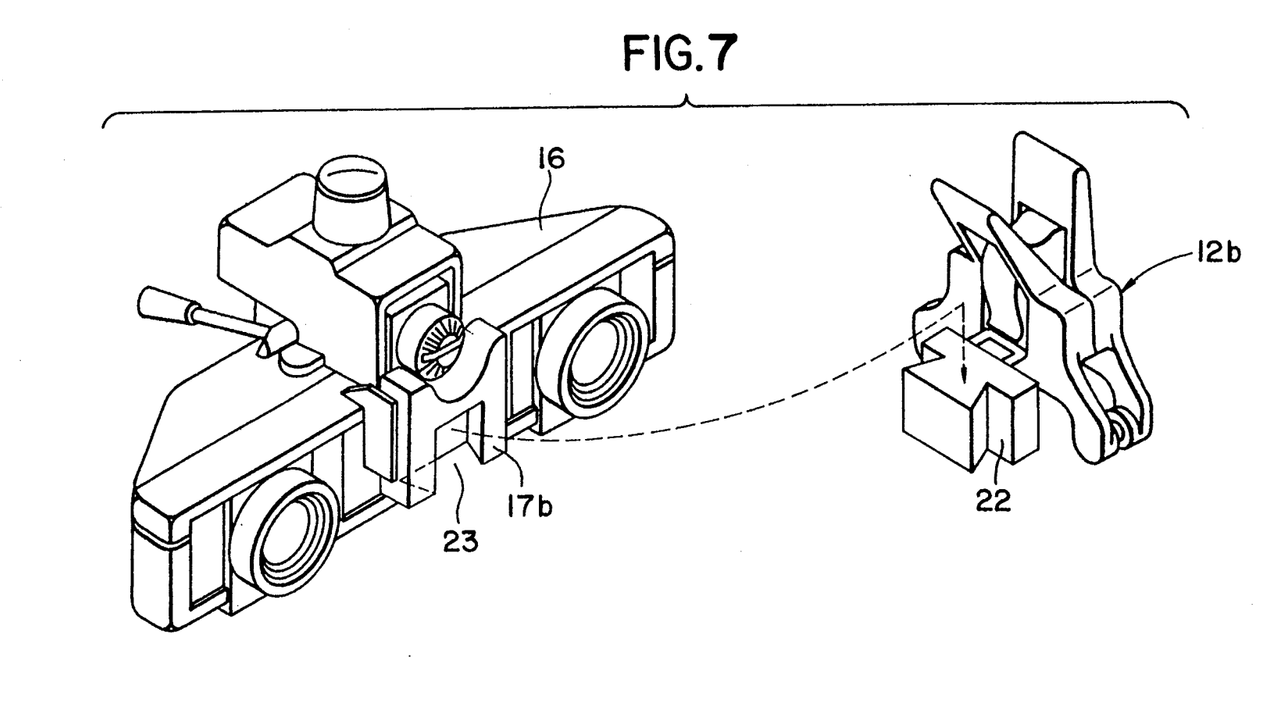

Similarly, FIG. 7 shows a dovetail attachment device comprising a male dovetail coupling element 22 and an opposite coupling plate 17b having a female dovetail slit 23 therein for receiving the male dovetail coupling element 22; which arrangement allows, according to how it is constructed, a height adjustment in a vertical direction.

Figure 8:
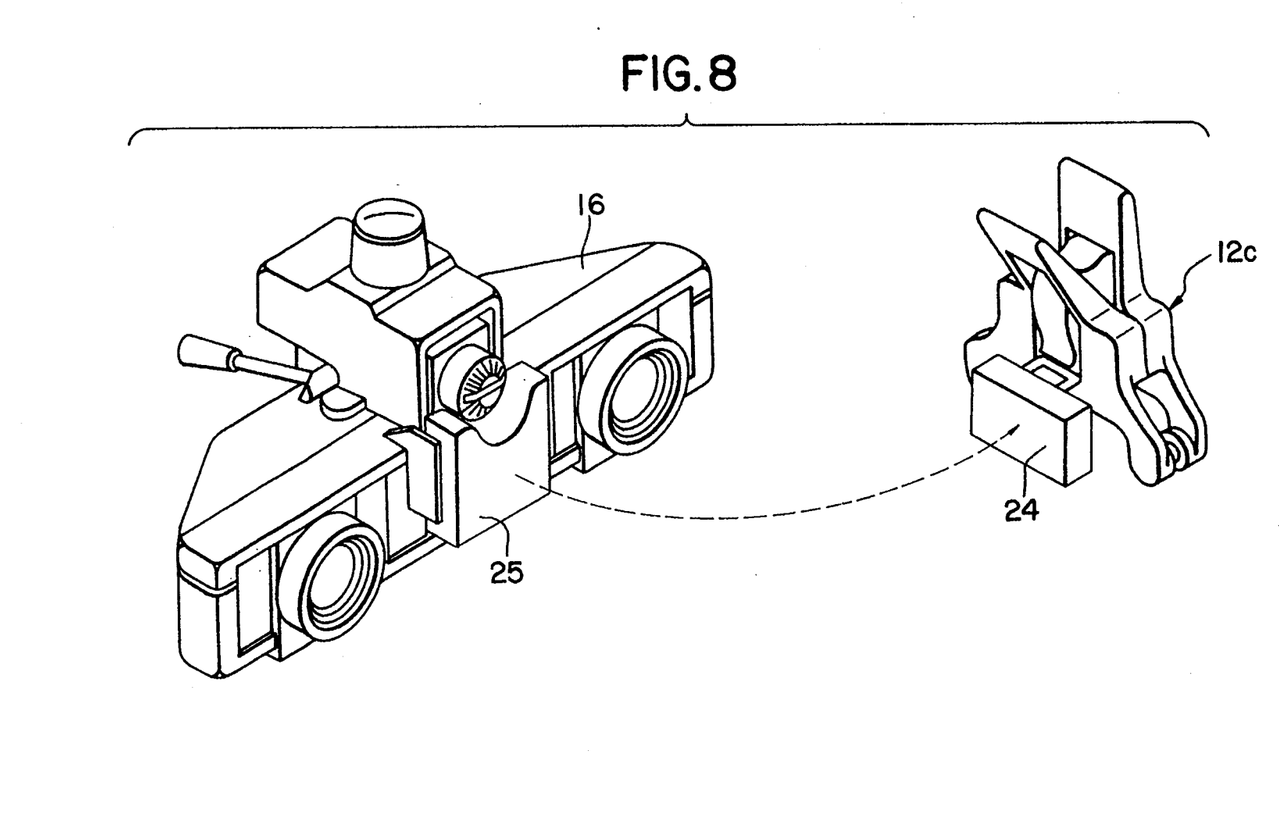

FIG. 8 depicts a force-interengaged embodiment of a clamp assembly in which a clamp 12c is held to an ophthalmoscope 16 by means of coupling magnets 24 and 25 which are respectively on the clamp 12c and the ophthalmoscope 16.

Figure 9:
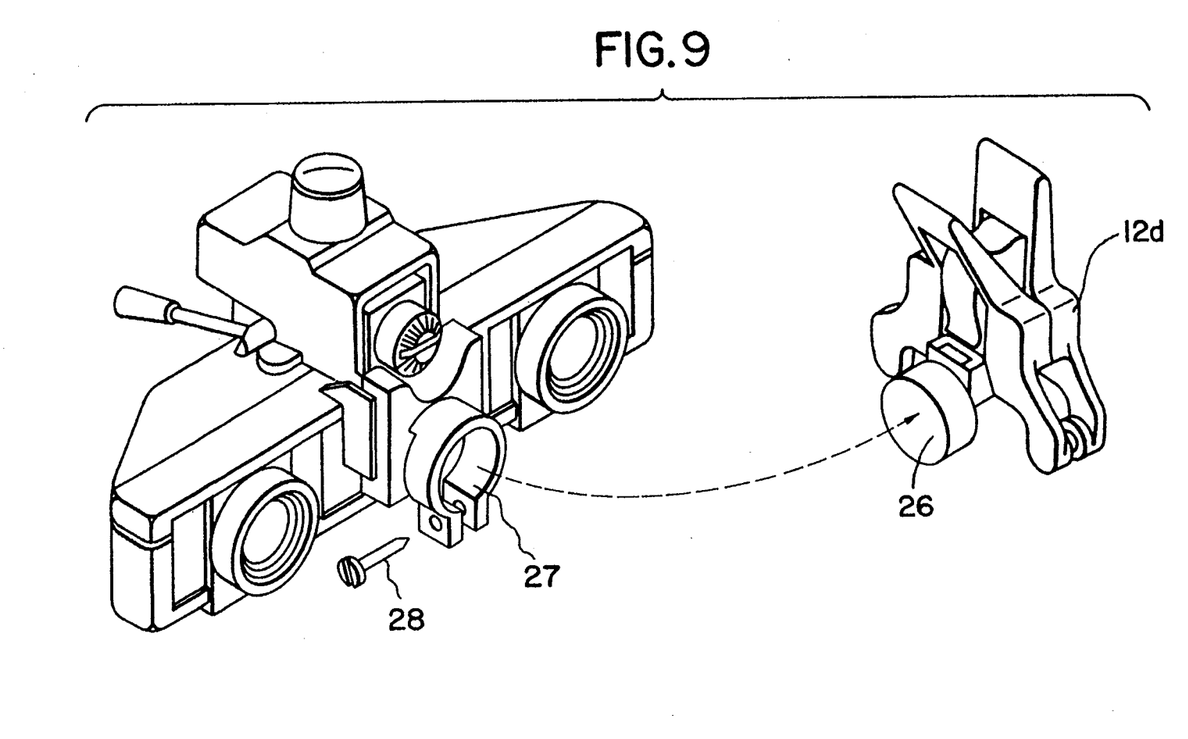

FIG. 9 shows an arrangement of this invention in which a lug 26 on a clamp 12d is received in a size-adjustable receiver 27. The lug can be attached to and released from the receiver 27 by manipulating a screw 28.

Figure 10:
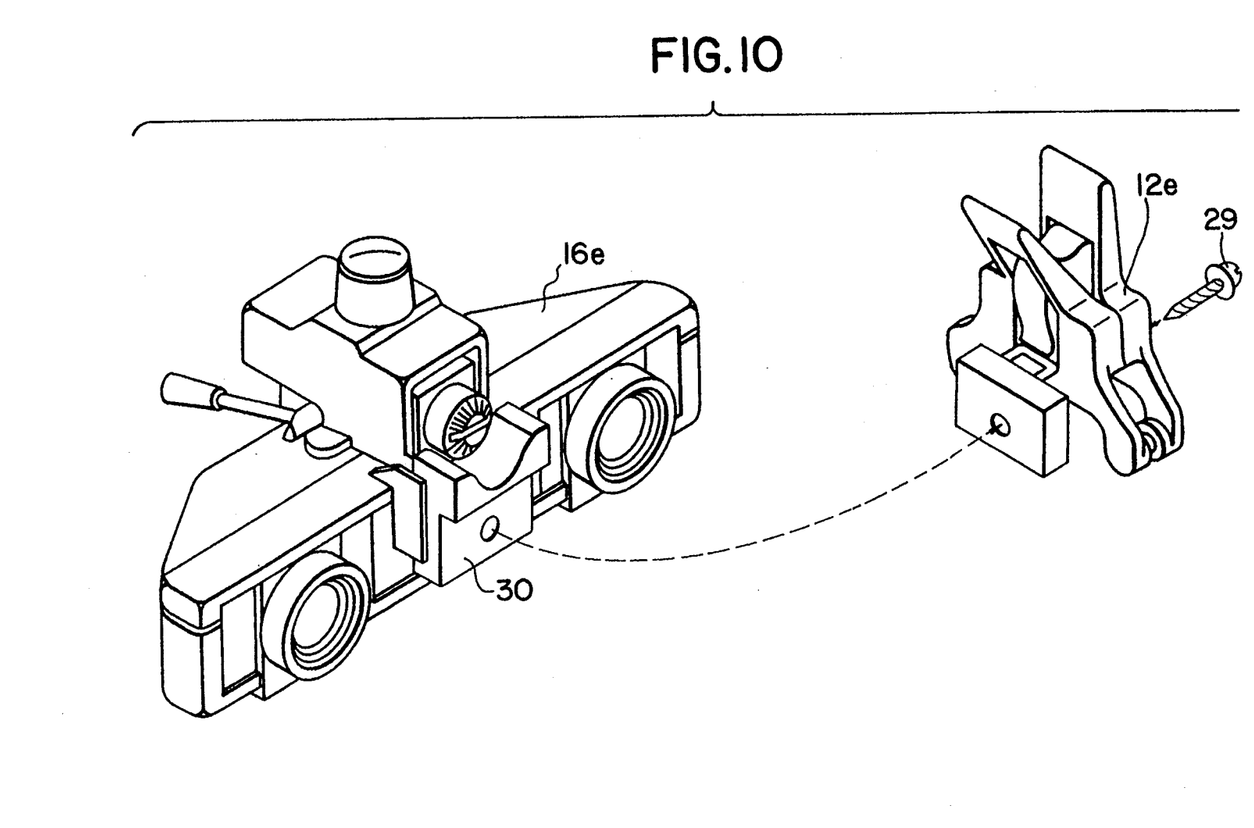

In the FIG. 10 embodiment a clamp 12e is attached to an ophthalmoscope 16e by means of a screw 29 which passes through a coupling element on the clamp 12e and threadably engages a coupling element 30 attached to the ophthalmoscope 16e.

Figure 11:
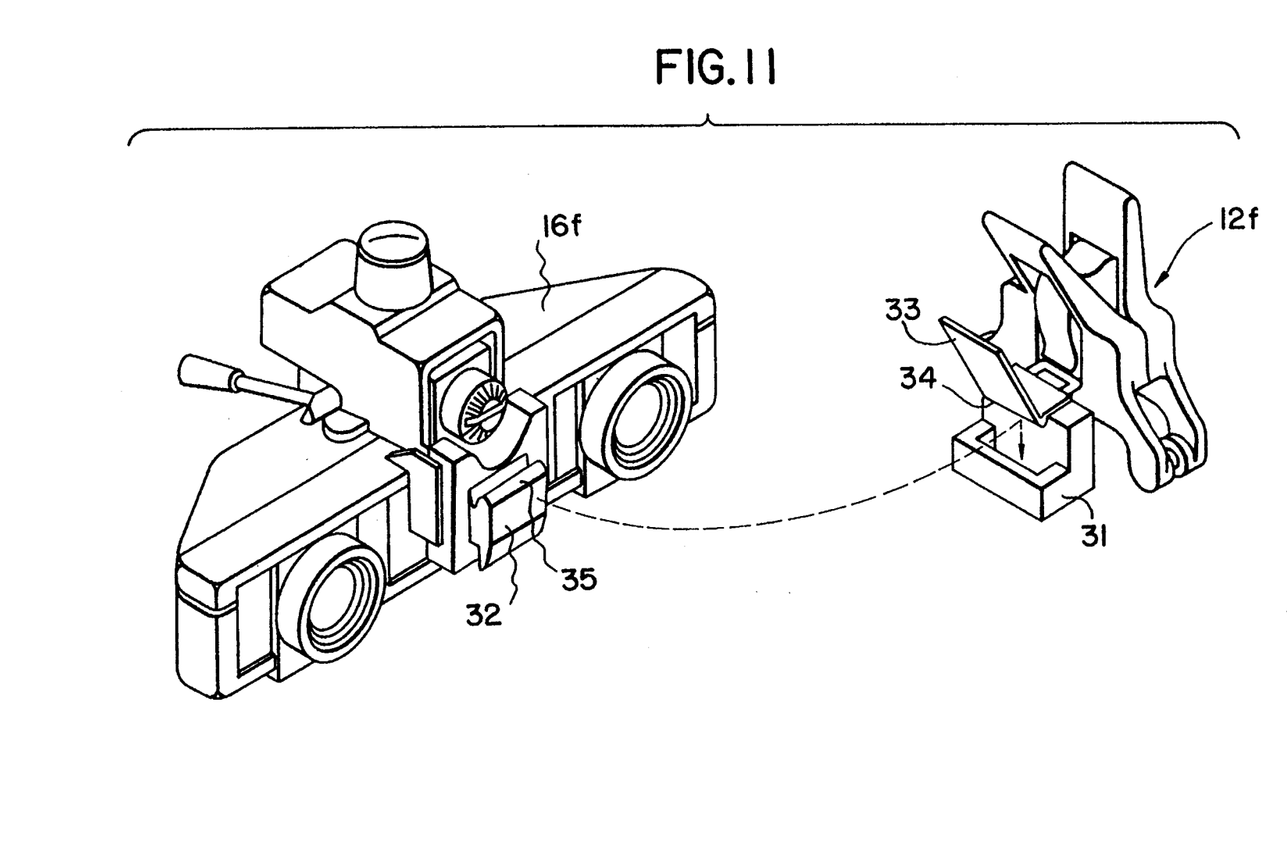

In the FIG. 11 embodiment, the attaching device comprises a spring snapping clamp assembly 31 on the clamp 12f for snapping onto an opposite coupling element 32 which is attached to the ophthalmoscope 16f. In this embodiment, the opposite coupling element 32 of the ophthalmoscope 16f can be removed from the snapping clamp assembly 31 by forcing a spring 33 of the snapping clamp assembly 31 back to release a latching nose 34 of the spring 33 from an edge 35 of the opposite coupling element 32.

It should be understood that in each of these embodiments a spring clamp assembly includes a releasable attachment device with a clamp coupling element affixed to a clamp lever and at least one optical-device coupling element for being affixed to, or part of, an optical device. However, the clamp assembly can also include a plurality of optical device coupling elements, each to be affixed to a different optical device, so that optical devices can be quickly and easily exchanged while still using the same clamp 12 on the eyeglasses.

While the invention has been particularly shown and described with reference to preferred embodiments, it will be understood by those of ordinary skill in the art that various changes in form and detail may be made therein without departing from the spirit and scope of the invention.

Preferably, the releasable attachment device is a plug/receptacle attachment device, a bayonet plug/socket connector, a dovetail connector, or a magnetic connector. Further examples of such attachment devices include screw connectors, connectors involving tongue-and-grooves, snapping clamp connectors, and the like.

For the protection of the eyeglass lenses, soft pads are provided on the clamping jaws.

The clamp assembly of this invention makes possible attachment of any desired optical device to any desired eyeglasses. In doing this, the clamp assembly of this invention only increases the overall weight of the mounting support an insubstantial amount.

The embodiments of the invention in which an exclusive property or privilege are claimed are defined as follows:

1. A clamp assembly set for attaching a variety of different optical devices to eyeglasses with the same clamp, said clamp assembly set comprising:
   a clamp including first and second levers linked at middle areas thereof with first ends thereof working together to form clamping jaws and second, opposite, ends thereof formed as opening grips for separating the clamping jaws, said clamp also including a spring means for loading the clamping jaws toward one another, said clamping jaws being in the form of forks with branches of the forks being formed, and ends of the branches of each fork being spaced from one another, so that they can extend across a bridge of a pair of eyeglasses for clamping onto the eyeglasses at inner, upper, edges thereof, said clamp further including a clamp coupling element affixed to the first lever; and
   a plurality of optical-device coupling elements, each for being affixed to a different one of a plurality of different optical devices;
   wherein said clamp coupling element and each of said optical-device coupling elements includes attaching means for selectively, and relatively easily, attaching to and detaching from one another for selectively attaching different ones of said different optical devices to the eyeglasses;
   whereby said plurality of different optical devices, each having one of said plurality of optical-device coupling elements thereon, can be selectively, and relatively easily, attached to and detached from said eyeglasses on which the clamp coupling element is mounted.

2. A clamp assembly set according to claim 1 wherein the attaching means of one of the clamp coupling element and each of the optical-device coupling elements includes plugs and the attaching means of the other defines sockets for receiving said plugs.

3. A clamp assembly set as in claim 1 wherein a linkage means for allowing relative movement affixes the first lever with the clamp coupling element.

4. A clamp assembly set as in claim 1 wherein the clamping jaws have soft pads thereon.

5. A clamp assembly set as in claim 1 wherein the attaching means of one of the clamp coupling element and each of the optical-device coupling elements includes a lug and the attaching means of the other defines a receiver for receiving the lug.

6. A clamp assembly set as in claim 1 wherein the attaching means of one of said clamp coupling element and each of said optical-device coupling elements includes a male dovetail connection part, the attaching means of the other defines a slit dovetail connection part for mating therewith.

7. A clamp assembly set as in claim 1 wherein the attaching means are magnetic elements which attract one another.

* * * * *